(No Model.)
L. M. CAMPBELL.
GARMENT STAY.
No. 433,719. Patented Aug. 5, 1890.
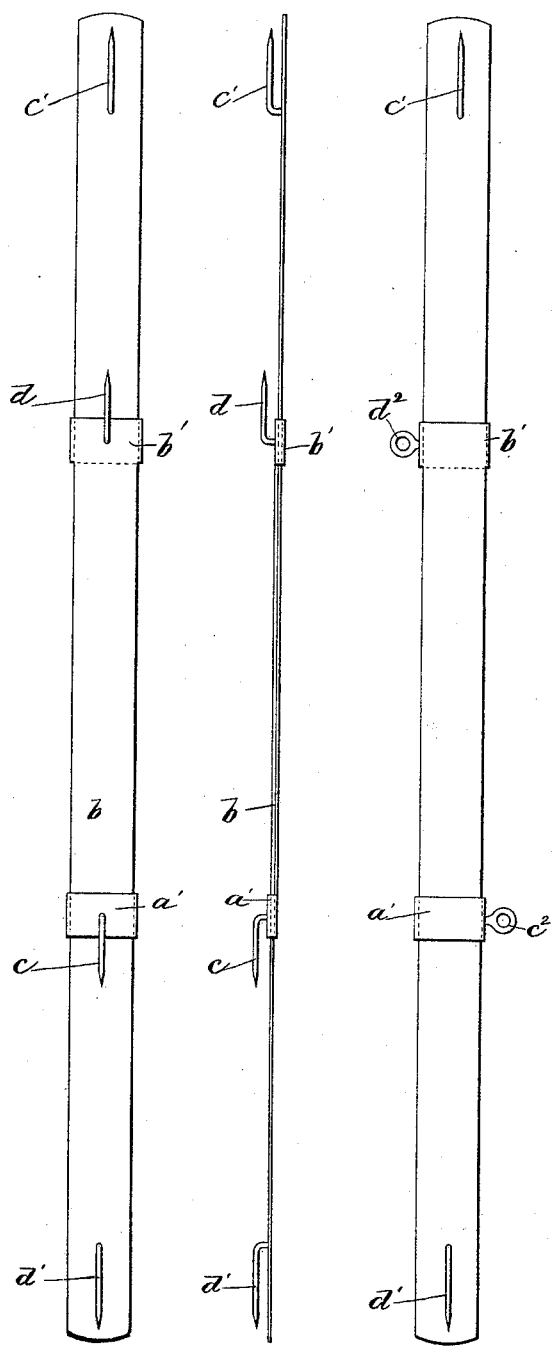
WITNESSES:
INVENTOR:
L. M. Campbell

UNITED STATES PATENT OFFICE.

LOUIS M. CAMPBELL, OF BOSTON, MASSACHUSETTS, ASSIGNOR TO GEORGE H. P. FLAGG, OF SAME PLACE.

GARMENT-STAY.

SPECIFICATION forming part of Letters Patent No. 433,719, dated August 5, 1890.

Application filed April 24, 1890. Serial No. 349,294. (No model.)

*To all whom it may concern:*

Be it known that I, LOUIS M. CAMPBELL, of Boston, in the county of Suffolk and State of Massachusetts, have invented certain new and useful Improvements in Garment-Stays, of which the following is a specification.

This invention has for its object to provide a garment-stay adapted particularly for application to vests and capable of being adjusted in length to suit the height of the buttoned portion of the vest; and it consists in the improved construction hereinafter described and claimed.

Of the accompanying drawings, forming a part of this specification, Figure 1 represents a side elevation of an adjustable stay embodying my invention. Fig. 2 represents an edge view of the same. Fig. 3 represents a side view showing different means for securing the stay to the garment.

The same letters of reference indicate the same parts in all the figures.

In carrying out my invention I make a garment-stay of two sections or strips $a$ $b$, of thin sheet metal, preferably steel. Said sections are adapted to slide one upon the other, and are connected by suitable means, so that collectively they will form a garment-stay of any desired length. The means for engaging the sections with each other so as to permit the sliding movement may be variously modified; but I prefer the means here shown, the section $a$ having a socket $a'$ formed on one of its ends through which the strip $b$ is adapted to pass, while the strip $b$ has a socket $b'$ formed on one of its ends through which the section $a$ passes. The said sockets fit the sections which pass through them so as to exert sufficient friction to hold the stay at any length to which it may be adjusted.

The stay is provided with suitable means for engaging it with the lining or other portion of the garment to which it is to be applied.

In Figs. 1 and 2 I have shown each section provided with two hooks projecting in opposite directions. $c$ and $c'$ represent the hooks on the section $a$, the hook $c$ being shown as attached to the socket $a'$ and projecting in one direction, while the hook $c'$ projects in the opposite direction and is attached to the section $a$ near the end opposite the socket $a'$. $d$ and $d'$ represent the hooks on the section $b$, the hook $d$ being attached to the socket $b'$ and projecting in one direction, while the hook $d'$ is attached to the section $b$ near the end opposite the socket $b'$ and projects in the opposite direction.

It will be seen that by inserting the oppositely-projecting hooks in the lining of a vest, and then extending the stay by an outward movement of one section upon the other, the stay will be securely engaged with the garment, the arrangement of the hooks preventing their accidental withdrawal.

I do not limit myself to the hooks as the means for securing the stay at points between the outer ends thereof. In Fig. 3 I have shown the stay provided with the end hooks $c'$ and $d'$, arranged as shown in Figs. 1 and 2; but instead of the intermediate hooks $c$ and $d$, I employ two eyes $c^2$ and $d^2$, the former attached to the socket $a'$ and the latter to the socket $b'$. Said eyes are to receive stitches that connect them to any suitable part of the garment.

I have found that by the application of a stay of the character herein described to a gentleman's vest the heretofore universal wrinkling of the vest, necessitating the frequent pulling down thereof, is entirely obviated and the vest kept in a smooth and unwrinkled condition.

I am aware that dress and corset stays have been constructed so that they can be shortened and lengthened telescopically, and that a stay that is not telescopic has been provided with projecting points adapted to engage the material of a garment. I am not aware, however, that a telescopic stay has ever been provided with projections adapted for attachment to the garment, so that the stay can be adjusted to a given length, and then secured at said length by its attachment to the garment without being necessarily placed between the lining and face of the garment and secured by quilting or stitching. By providing the sliding sections with the projecting pins or with the equivalent projections—viz., the eyes $c^2$ $d^2$ $f$ $f'$—I enable the stay to be placed in contact with the exposed surface of a vest-lining adjusted to the desired length and secured to the lining without ripping the lining and inserting the stay between the lining and facing, which would be necessary if said projections were not employed.

I claim—

1. In a garment-stay, the combination of the section $a$, having at its inner end the socket $a'$ and at its outer end the hooked pin $c'$, extending lengthwise of the section and projecting away from said socket, the section $b$, having at its inner end the socket $b'$ and at its outer end the hooked pin $d'$, extending in the opposite direction to the pin $c'$, each section being adapted to slide in the socket on the other to lengthen the stay, and at the same time to cause the oppositely-extending end pins to penetrate the material of a garment on which the stay is placed, and projections on said sections between the pins $c'$ $d'$, whereby the sections may be secured to the garment and thereby held at any adjustment of which they are capable, as set forth.

2. In a garment-stay, the combination of the section $a$, having the socket $a'$, and the hooked pins $c$ $c'$, extending lengthwise of the section in opposite directions, and the section $b$, having the socket $b'$, and the pins $d$ $d'$, extending lengthwise of the section $b$ in opposite directions, each section being adapted to slide in the socket on the other to shorten or lengthen the stay, while said pins are adapted to engage the material of a garment against which the stay is placed and thereby hold the stay at any length to which it may be adjusted.

In testimony whereof I have signed my name to this specification, in the presence of two subscribing witnesses, this 19th day of April, A. D. 1890.

LOUIS M. CAMPBELL.

Witnesses:
C. F. BROWN,
A. D. HARRISON.